United States Patent [19]

Yamaguchi et al.

[11] Patent Number: 4,717,368
[45] Date of Patent: Jan. 5, 1988

[54] STEPLESS BELT TRANSMISSION

[75] Inventors: Kozo Yamaguchi, Nagoya; Masahiro Hasebe, Anjo, both of Japan

[73] Assignee: Aisin-Warner Kabushiki Kaisha, Aichi, Japan

[21] Appl. No.: 824,383

[22] Filed: Jan. 23, 1986

[51] Int. Cl.⁴ ............................................. F16H 55/52
[52] U.S. Cl. ........................................................ 474/28
[58] Field of Search ............................... 474/11, 12, 28

[56] References Cited

U.S. PATENT DOCUMENTS

| 4,228,691 | 10/1980 | Smirl | 474/28 |
| 4,400,164 | 8/1983 | Cadee | 474/28 |
| 4,560,369 | 12/1985 | Hattori | 474/28 |
| 4,583,423 | 4/1986 | Hahne | 474/28 |
| 4,585,430 | 4/1986 | Gaddi | 474/28 |

Primary Examiner—Stephen J. Novosad
Assistant Examiner—William P. Neuder

Attorney, Agent, or Firm—Wegner & Bretschneider

[57] ABSTRACT

A stepless belt transmission includes a working fluid control unit having a supply port for supplying working fluid to a hydraulic actuator, a discharge port for discharging the working fluid from the hydraulic actuator, a lead mechanism for changing the working fluid pressure internally of the hydraulic actuator by varying the opening degree of the supply port or discharge port in dependence upon vehicle running conditions, and a follow-up mechanism operatively associated with a movable flange displaced by the changed working fluid pressure to restore the port opening degree varied by the lead mechanism. It is possible to achieve highly sophisticated control of transmission ratio in dependence upon vehicle running conditions through a comparatively simple construction and on the basis of a simple control method in which the stroke of the lead mechanism is suitably regulated.

3 Claims, 13 Drawing Figures

STEPLESS BELT TRANSMISSION

BACKGROUND OF THE INVENTION

This invention relates to a stepless belt transmission mainly for automotive vehicles.

A stepless belt transmission is equipped with a transmission mechanism comprising input and output pulleys of variable effective diameter each having a movable flange and stationary flange, a transmission belt linking the input and output pulleys, and a hydraulic actuator for varying the effective diameter of the input or output pulley to control the transmission ratio. The stepless belt transmission also includes a control unit equipped with a transmission ratio control mechanism which effects shifting by supervising the supply and discharge of the working fluid to and from the actuator in dependence upon such vehicle running conditions as vehicle speed, throttle opening, selected speed range and output shaft torque. Transmission ratio control mechanisms known in the art include an electromagnetic solenoid valve-spool valve combination, as disclosed in the specification of Japanese Patent Application Laid-Open No. 58-57552, and a configuration in which a spool valve is coupled to a movable flange by linkage, as set forth in the specification of Japanese Patent Application Laid-Open No. 57-161345.

While the arrangement relying upon the combination of solenoid and spool valves is simple in structure and of compact size, there is a tendency for control to become overly complicated when it is attempted to perform a complex shifting operation. In the arrangement having the spool valve linked to the movable flange, a space limitation is imposed in terms of the structure of the linkage. Another problem is that the coupled portions tend to rattle.

SUMMARY OF THE INVENTION

An object of the present invention is to provide a stepless belt transmission which solves the aforementioned problems encountered in the prior art.

Another object of the present invention is to provide a stepless belt transmission capable of highly sophisticated control of transmission ratio in dependence upon vehicle running conditions through a comparatively uncomplicated structure and a simple control method.

According to the present invention, the foregoing objects are attained by providing a stepless belt transmission comprising a transmission mechanism and a control unit. The transmission mechanism includes input and output pulleys of variable effective diameter each having a movable flange and a stationary flange, a transmission belt linking the input and output pulleys, and servomechanisms for varying the effective diameter of the input and output pulleys, at least one of the servomechanisms being a hydraulic actuator. The control unit is operable to supply the hydraulic actuator with a working fluid, or to discharge the working fluid from the hydraulic actuator, in dependence upon the vehicle running conditions to shift the transmission mechanism. The control unit for such control of the working fluid includes a supply port for supplying the working fluid to the hydraulic actuator, a discharge port for discharging the working fluid from the hydraulic actuator, a lead mechanism for changing the working fluid pressure internally of the hydraulic actuator by varying the opening degree of the supply port or discharge port in dependence upon the vehicle running conditions, and a follow-up mechanism operatively associated with a movable flange displaced by the changed working fluid pressure to restore the port opening degree varied by the lead mechanism, whereby the supply and discharge of the working fluid for actuating the hydraulic actuator is controlled.

Thus, the stepless belt transmission of the present invention includes a working fluid control unit comprising the supply port for supplying the working fluid to the hydraulic actuator, the discharge port for discharging the working fluid from the hydraulic actuator, the lead mechanism for changing the working fluid pressure internally of the hydraulic actuator by varying the opening degree of the supply port or discharge port in dependence upon the vehicle running conditions, and the follow-up mechanism operatively associated with a movable flange displaced by the changed working fluid pressure to restore the port opening degree varied by the lead mechanism. Accordingly, the stepless belt transmission of the invention makes it possible to achieve highly sophisticated control of transmission ratio in dependence upon vehicle running conditions through a comparatively simple construction and on the basis of a simple control method in which the stroke of the lead mechanism is suitably regulated.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1A:
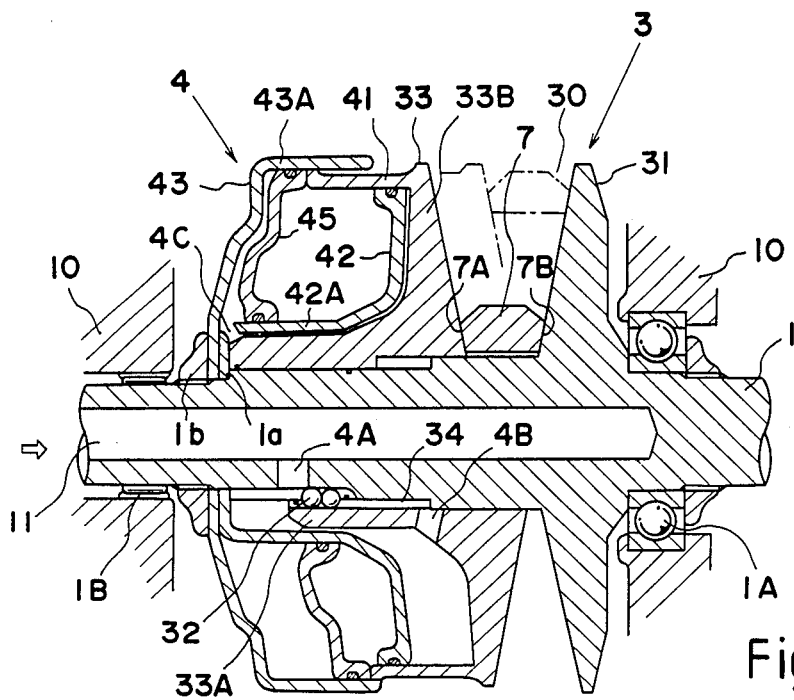
FIGS. 1A and 1B is a sectional view illustrating a first embodiment of a stepless belt transmission according to the present invention.
Figure 1B:
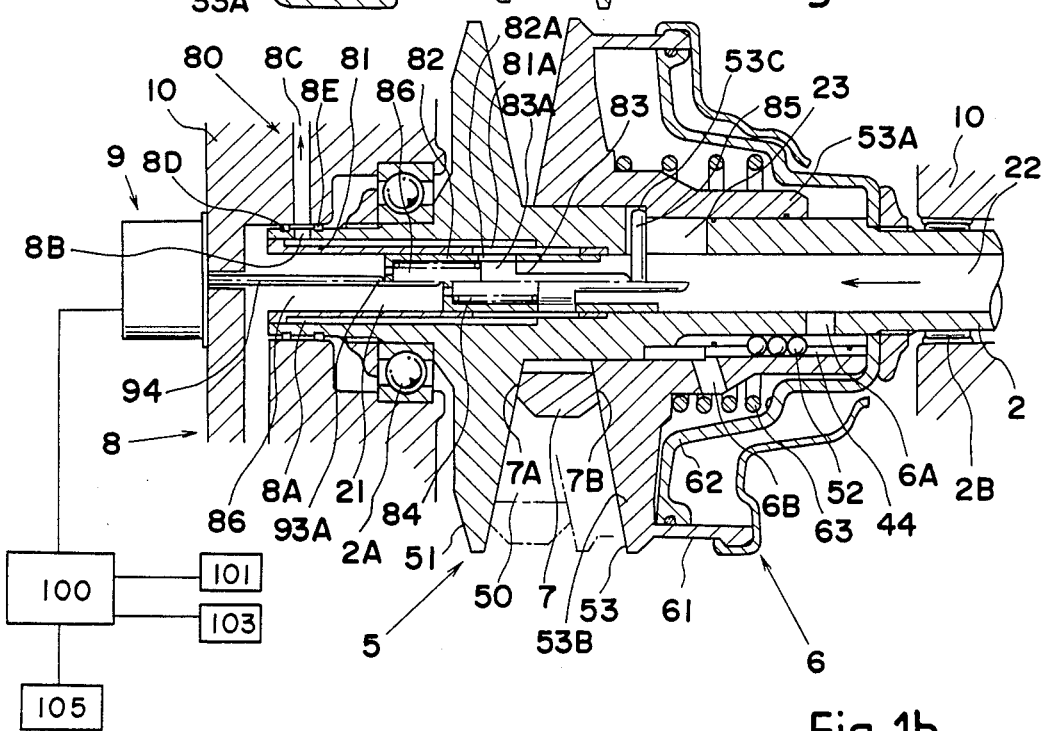
Figure 2:
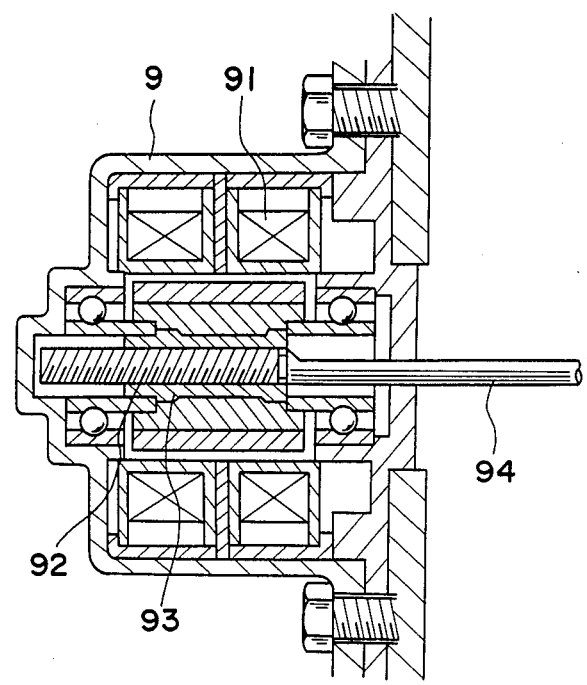
FIG. 2 is a sectional view of a drive mechanism.

Reference will be had to FIGS. 1A and 1B and 2 to describe a first embodiment of a stepless belt transmission according to the present invention. The transmission includes an input shaft 1, an output shaft 2 placed in juxtaposition with the input shaft 1, an input pulley 3 provided on the input shaft 1, an actuator 4 for the input pulley 3, an output pulley provided on the output shaft 2, an actuator 6 for the output pulley 5, a transmission belt 7 linking the input pulley 3 and output pulley 5, and a working fluid control unit 8 provided in coaxial relation with the output shaft 2.

As shown in FIGS. 1A and 1B, the input shaft 1 is rotatably supported by bearings 1A, 1B in a transmission case 10. One end of the input shaft 1 is coupled to a vehicle engine, not shown, through a clutch apparatus such as a mechanical clutch, electromagnetic clutch or fluid transmission unit. Formed within the input shaft 1 in coaxial relation therewith is a working fluid supply passageway 11 leading to the actuator 4, which is a hydraulic actuator in the illustrated embodiment.

The output shaft 2 is rotatably supported by bearings 2A, 2B in the transmission case 10 and is coupled to the drive wheels of the vehicle through, e.g., a forward/reverse changeover mechanism and differential mechanism. The output shaft 2 has a hollow interior one end of which (i.e., the left end in FIG. 1B) defines a cylindrical chamber 21 for accommodating the principal portion of the control unit 8. The hollow interior of the output shaft 2 at the other end thereof defines a working fluid supply passageway 22 leading to the hydraulic actuator 6.

The input pulley 3 comprises a stationary flange 31 formed integral with the input shaft 1, and a movable flange 33 having a sleeve portion 33A fitted on the input shaft 1 and a flange portion 33B opposing the stationary flange 31 for defining a V-shaped recess 30 which receives the transmission belt 7. The movable flange 33 is engaged with the input shaft 1 so as to be freely displaceable axially of the input shaft 1 and rotatable circumferentially thereof by a ball key 32 fitted into a keyway 34.

The hydraulic actuator 4 of the input pulley 3 in the present embodiment employs a double piston arrangement in which two pistons are provided axially in a series configuration. Specifically, the hydraulic actuator 4 comprises a first cylinder 41 provided on the outer circumferential portion of the movable flange 33, a toroidal first stationary wall 42 shaped to follow the contour of the outer surface of movable flange 33 and having an outer periphery in sliding contact with the inner circumferential surface of the first cylinder 41 via a seal ring, an inner periphery secured to the input shaft 1 and a cylindrical portion 42A provided at an intermediate portion and situated on the outer side of the movable flange 33, a second cylinder 43 having an outer circumferential cylindrical portion 43A and end portion whereof overlaps the outer side of the end portion of first cyclinder 41, the inner periphery of the second cylinder being secured to the input shaft 1 and defining a second stationary wall, and a toroidal, plate-shaped second piston 45 arranged between the first stationary wall 42 and the second cylinder 43 and having an outer periphery in sliding contact with the inner circumferential surface of the cylindrical portion 43A of second cylinder 43 via a seal ring and in abutting contact with the end portion of the first cylinder 41, and an inner periphery in sliding contact with the outer circumferential surface of the cylindrical portion 42A of first stationary wall 42 via a seal ring. In the illustrated embodiment, the input shaft 1 is provided with a step 1a and is threadedly engaged by a nut 1b. The first stationary wall 42 and the second cylinder 43 are secured to the input shaft 1 by fixing them at their inner circumferential portions between the step 1a and the nut 1b.

The working fluid is supplied to the first cylinder 41 through a radially extending hole 4A provided in the input shaft 1 to communicate the working fluid supply passageway 11 and the keyway 34, and an inclined hole 4B provided in the sleeve portion 33A of movable flange 33 to communicate the keyway 34 with the interior of the first cylinder 41. The working fluid is supplied to the second cylinder 43 through a hole 4C formed in the end of the cylindrical portion 42A of first stationary wall 42 to communicate the interior of the first cylinder 41 and the interior of the second cylinder 43. When the working fluid is supplied, the movable flange 33 is urged rightward by the hydraulic pressure in the first cylinder 41 to narrow the V-shaped recess 30, and the hydraulic pressure in the second cylinder 43 is impressed upon the piston 45, which also acts to urge the movable flange 33 rightward, thereby clamping the transmission belt 7 between the movable and stationary flanges 33, 31 by varying the effective diameter of the input pulley.

The output pulley 5 comprises a stationary flange 51 provided integral with the output shaft 2, and a movable flange 53 having a sleeve portion 53A fitted on the output shaft 2 and a flange portion 53B opposing the stationary flange 51 for defining a V-shaped recess 50 which receives the transmission belt 7. The movable flange 53 is engaged with the output shaft 2 so as to be freely displaceable axially of the output shaft 2 and rotatable circumferentially thereof by a ball key 52 fitted into a keyway 54. The movable flanges 33, 53 of the input and output pulleys 3, 5, respectively, are provided on mutually opposing sides with respect to the stationary flanges 31, 51 to make possible axial displacement of the transmission belt 7 cause by a shift.

The actuator 6 of the output pulley 5 comprises a cylinder 61 projecting from the outer periphery of the flange portion 53B of movable flange 53, a toroidal stationary wall 62 having an outer periphrey in sliding contact with the inner circumferential wall surface of cylinder 61 via a seal ring and an inner periphery secured to the output shaft 2, and a spring 63 mounted between the movable flange 53 and the stationary wall 62. The working fluid is supplied to the cylinder 61 through a radially extending hole 6A provided in the output shaft 2 to communicate the working fluid supply passageway 22 and the keyway 44, and an inclined hole 6B provided in the sleeve portion 53A of movable flange 53 to communicate the keyway 44 with the interior of the cylinder 61.

The transmission belt 7 has contact surfaces 7A, 7B in frictional contact with flange surfaces defining the V-shaped recesses 30, 50 and is stretched between the input pulley 3 and the output pulley 5. The V-shaped recesses 30, 50 of the input and output pulleys 3,5 are displaced to vary the effective diameter of the belt 7 and effect shifting based upon the clamping force applied to the transmission belt 7 by the working fluid pressure of actuator 4 for the input pulley 3 and the working fluid pressure of actuator 6 for the output pulley 5.

The working fluid control unit 8 comprises a guide sleeve 81 fitted into the control unit accommodating chamber 21 of the output shaft 2 to define a clearance 8A forming a working fluid passage in the chamber 21, the guide sleeve 81 being provided with an elongated working fluid flow passage 81A extending in the axial direction and communicating the interior and exterior of the sleeve, a lead sleeve 82 slidably fitted in the guide sleeve 81 and having an intermediate portion provided with an in/out port 82A communicating with the flow passage 81A at all times, a drive mechanism 9 which, in the present embodiment, is attached to the transmission case 10 on the stationary flange side (left side) of the output pulley 5 and in coaxial relation with the output shaft 2 for axially displacing the lead sleeve 82 in dependence upon such vehicle running conditions as vehicle speed, rotating speed of the input shaft, throttle opening and the set position of a speed selecting mechanism (i.e., the set position of a shift lever of an automatic transmission), and a follow-up plunger 83 having a land 83A closing the in/out port of the lead sleeve 82, one end of the plunger being backed by a spring 84 fastened to the left end wall of the lead sleeve 82 of the left or drain path-side of the drawing, the other end of the plunger being in abutting contact with an inner circumferential step portion 53C of the movable flange 53. The follow-up plunger 83 is connected to the movable flange 53 of the output pulley 5 by a pin 85 passing through a slit 23 provided in the output shaft 2 and is operatively associated with the movable flange 53. The side of the follow-up plunger 83 backed by spring 84 defines a drain passage 86 for the working fluid. The in/out port 82 communicates with the hydraulic actuator 4 of the input pulley 3 via a working fluid supply/discharge passage 80 including the clearance 8A between the inner periphery of the control unit accommodating chamber 21 and the outer periphery of the guide sleeve 81, a working fluid passageway 8C provided in the transmission case 10 and communicating with the working fluid supply passageway 11 of the input shaft 1, a radially extending hole 8B provided in the output shaft 2 and communicating the passageway 8C and the clearance 8A, and sealing members 8D, 8E provided on both sides of the radially extending hole 8B for sealing off the gap between the output shaft 2 and the transmission case 10.

The lead sleeve 82 and drive mechanism 9 constitute a lead mechanism in accordance with the present invention. As shown in FIG. 2, the drive mechanism 9 comprises a well-known stepping motor 91, a drive cylinder 93 constituting the output shaft of the stepping motor 91 and formed to include threads 92 on its inner side, and an operated rod 94 having an aft end threadedly engaged with the internal threads 92, an intermediate portion formed with a cut-out portion to prevent rotation, and a distal end abutting against the end of the lead sleeve 82 on the drain side. Rotating the stepping motor 91 causes the operated rod 94 to be axially displaced inside the guide sleeve 81 to regulate the degree of communication among the working fluid supply/discharge passage 80, working fluid supply passageway 22 and working fluid drain passage 86.

The movable flange 53 of the output pulley 5, the pin 85 engaging with the step 53C on the sleeve portion 53A of movable flange 53 and abutting against the end of the follow-up plunger 83 through the axial slit formed in the output shaft 2, and the plunger 83 construct a follow-up mechanism in accordance with the present invention.

The follow-up mechanism operates in the following manner. The hydraulic actuator 4 of input pulley 3 is brought into communication with either the working fluid supply passageway 22 or drain passage 86 via the in/out port 82A by the lead mechanism. This causes an increase or decrease in hydraulic pressure (servo pressure) inside the hydraulic actuator 4, so that the movable flange of input pulley 3 either reduces the width of the V-shaped recess 30 to enlarge the effective diameter of the input pulley or increases the width of the recess 30 to diminish the effective diameter of the input pulley, thereby increasing or decreasing the tension on the transmission belt 7. The movable flange 53 of the output pulley 5 is displaced under the action of actuator 6 to enlarge or diminish the width of the V-shaped recess 50 so as to compensate for the change in the tension of transmission belt 7, at which time the follow-up plunger 83 is displaced so as to cut off the communication between the in/out port 82A and either the working fluid passageway 22 or drain 86.

The overall operation of the stepless belt transmission of the present invention will now be described.

When an up-shift is performed for a lower gear ratio, an electronic control device 100 compares output signals from such units as an input shaft rotating speed sensor 101 and throttle opening sensor 103 with set values stored in a memory 105. The electronic control device 100 then produces an output signal based on the results of the comparison and delivers the signal to an electric motor 91, such as a stepping motor to displace the operated rod 94 rightward, namely in the direction of the working fluid supply passageway 22, by a prescribed amount. As a result, the in/out port 82A and the land 83A underlap on the side of the supply passageway 22 and overlap on the side of the drain passage 86, so that the degree of communication between the port 82A and the supply passageway 22 increases, whereas communication on the side of the drain passage 86 is cut off. Owing to the greater communication between the supply/discharge passage 80 and the supply passageway 22, high pressure (e.g., line pressure) from the supply passageway 22 is delivered to the hydraulic actuator 4 via the supply/discharge passage 80. In response, the movable flange 33 of the input pulley 3 is subjected to a greater pushing force in a direction which will enlarge the effective diameter of the input pulley 3, thus causing the width of the V-shaped recess 30 to diminish while displacing the transmission belt 7 radially outward. This displacement of the transmission belt 7 increases its tension, so that the movable flange 53 of the output pulley 5 is urged in a direction (rightward in FIG. 1B) which will reduce the effective diameter of the output pulley, thereby widening the V-shaped recess 50. Attendant upon this displacement of the movable flange 53, the follow-up plunger 83 is displaced in the same direction as the lead sleeve 82. As a result, the in/out port 82A and the land 83A are restored to their original positions relative to each other to fix the transmission ratio.

When a down-shift is performed for a higher transmission ratio, the lead sleeve 82 is displaced leftward in FIG. 1B by the drive mechanism 9, as a result of which the relationship between the in/out port 82A and land 83A is changed to increase the degree of communication between the in/out port 82A and the drain passage 86 and cut off the communication between the in/out port 82A and the working fluid supply passageway 22. This causes the working fluid in hydraulic actuator 4 to be discharged into the drain passage 86 through the working fluid supply/discharge passage 80 to reduce the working fluid pressure. As a result, the movable flange 33 is displaced leftward in FIG. 1A to reduce the effective diameter of the input pulley 3 and, hence, diminish the tension of transmission belt 7. This causes the movable flange 53 of the output pulley 5 to be displaced leftward in FIG. 1 to increase the effective diameter of the output pulley 5 and, as a result, to compensate for the reduced tension of the transmission belt 7. The down-shift is thus achieved. Owing to the leftward displacement of the movable flange 53, the follow-up plunger 83 is moved to the left in FIG. 1B to restore the original relationship between the in/out port 82A and the land 83A, thus completing the shift. The hydraulic pressure required at the hydraulic actuator 4 fluctuates in order that slip between the transmisison belt 7 and pulleys 3, 5 will not be caused by an increase or decrease in transmission torque. This fluctuation in the required hydraulic pressure is dealt with by regulation of the working fluid pressure from the working fluid supply passageway 22 or by adjustment of the degree of communication between the in/out port 82A and the supply passageway 22 and drain passage 86.

In the embodiment of FIGS. 1A and 1B, the working fluid pressure of the hydraulic actuator 4 is controlled at both ends of the land 83A lapping the single in/out port 82A. Rather than this single in/out port, however, it is permissible to provide an in port, drain port and out port which are mutually independent and to provide the follow-up plunger with lands that correspond to the in port and drain port for opening and closing them.

Figure 3A:
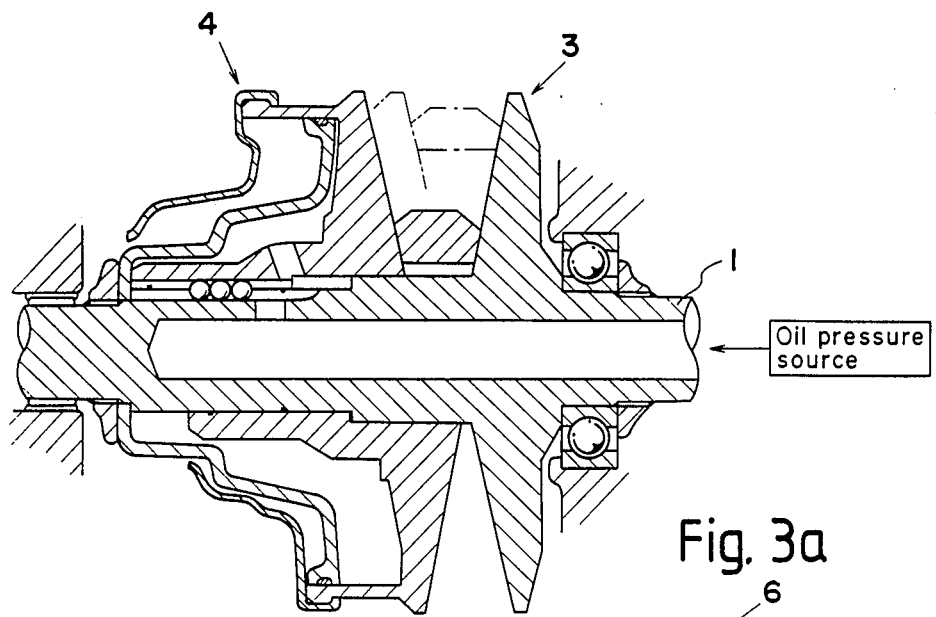
FIGS. 3A and 3B is a sectional view illustrating a second embodiment of a stepless belt transmission according to the present invention.
Figure 3B:
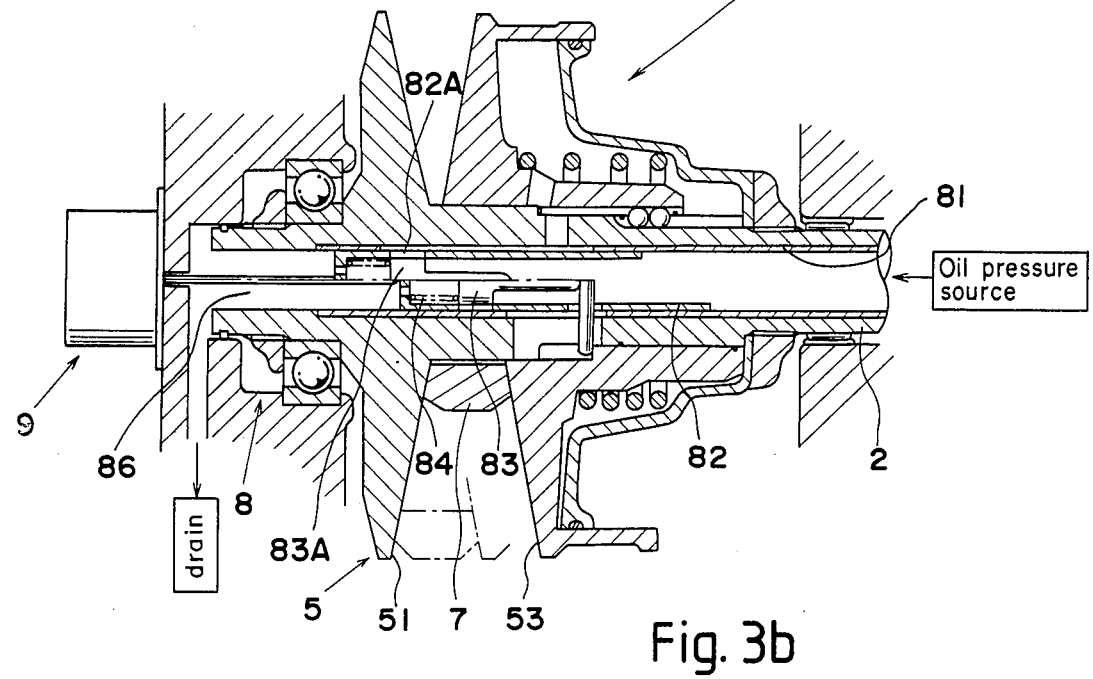

FIGS. 3A and 3B illustrates a second embodiment of the present invention, in which portions similar or corresponding to those shown in FIGS. 1A and 1B are designated by like reference characters.

To control the transmission ratio in this second embodiment of the transmission, the actuator 4 of the input pulley 3 is supplied with working fluid of a pressure regulated to correspond to the input torque and transmission ratio, and the supply and discharge of the working fluid to and from the actuator 6 of the output pulley 5 is performed by the working fluid control unit 8 in a manner similar to that of the first embodiment.

Figure 4A:
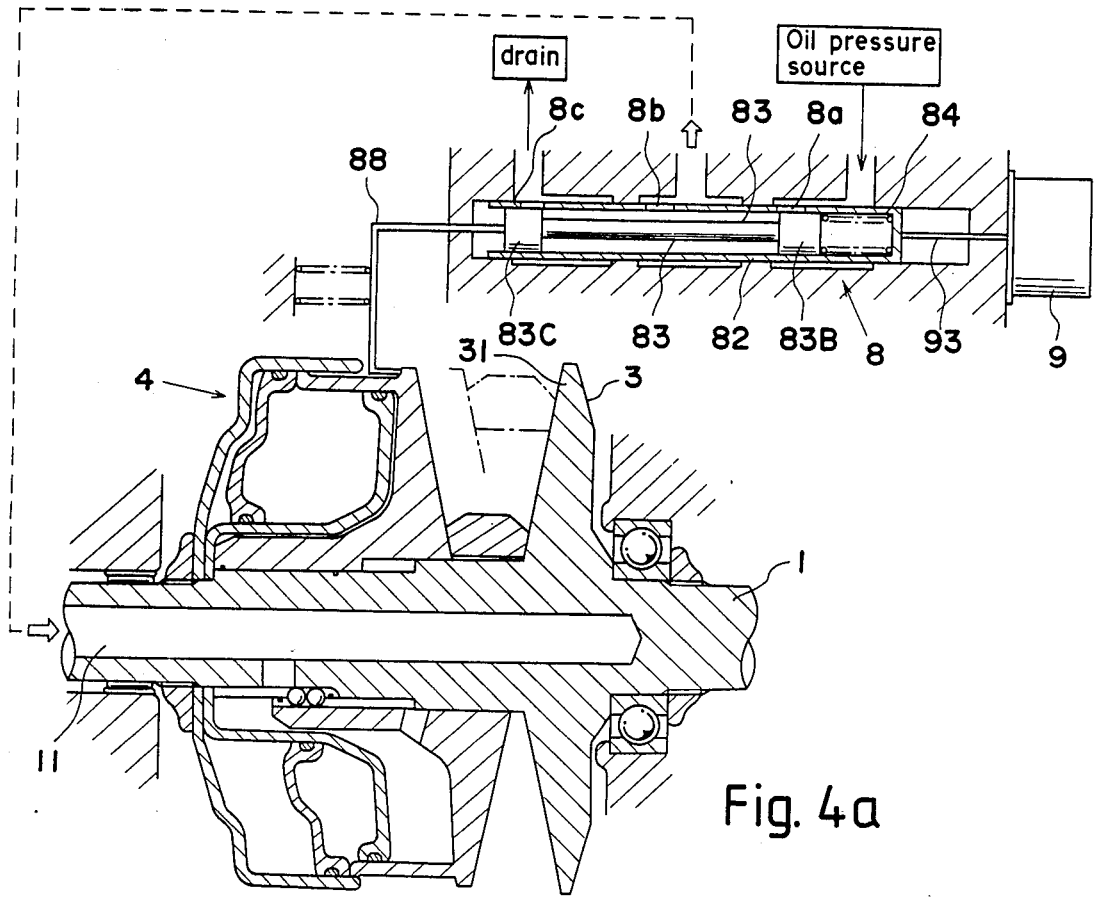
FIGS. 4A and 4B is a sectional view illustrating a third embodiment of a stepless belt transmission according to the present invention.
Figure 4B:
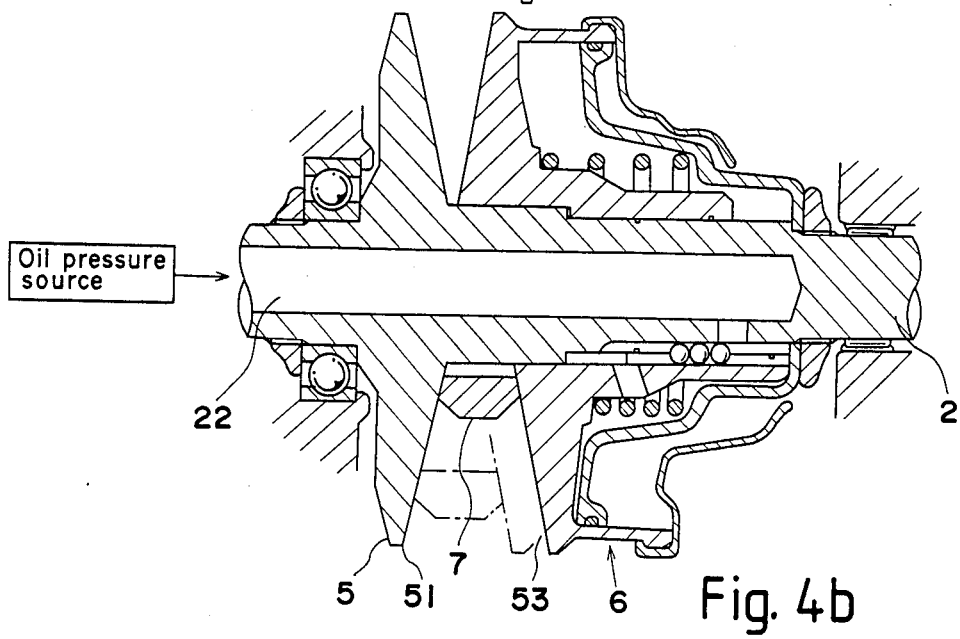

FIGS. 4A and 4B illustrate a third embodiment of the present invention, in which portions similar or corresponding to those shown in FIGS. 1A and 1B are designated by like reference characters.

In this third embodiment the working fluid control unit 8 is provided in the transmission case on the input shaft side. The lead sleeve 82 has an in port 8a, an out port 8b and a drain port 8c, and the follow-up plunger 83 includes a land 83B for opening and closing the in port 8a and a land 83C for opening and closing the drain port 8c. The out port 8b is in communication with the actuator 4 of the input pulley via the working fluid supply passageway 11 provided in the input shaft 1. The lead sleeve 82 is driven by the drive mechanism 9, and the follow-up plunger 83 is operatively coupled to the movable flange 33 of the input pulley 3 via a connecting rod 88.

Figure 5A:
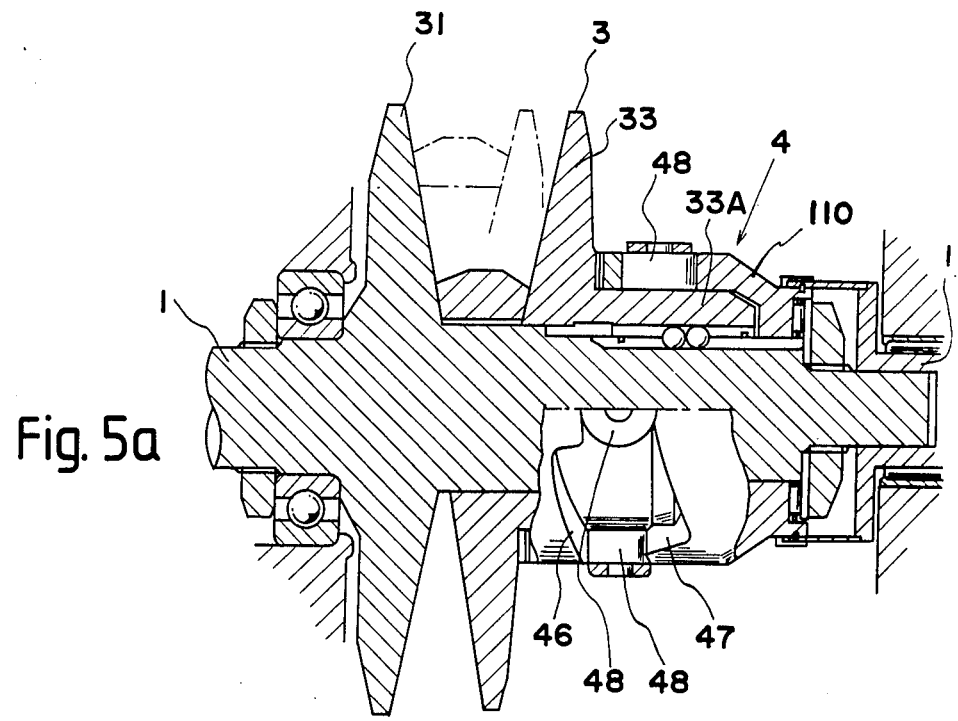
FIGS. 5A and 5B is a sectional view illustrating a fourth embodiment of a stepless belt transmission according to the present invention.
Figure 5B:
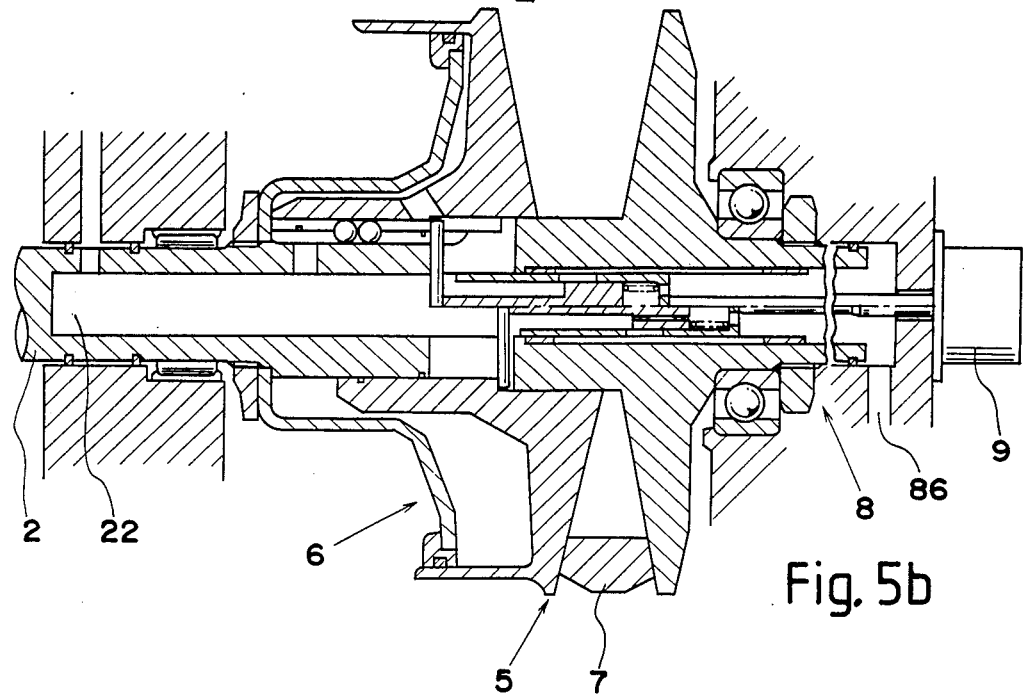

In a fourth embodiment of the invention shown in FIGS. 5A and 5B, the actuator 4 of the input pulley 3 employs a cam mechanism in which a plurality of blocks 48 in sliding contact with the sleeve portion 33A of the movable flange 33 and pivotally mounted on an outer ring 110 are placed between cam surfaces 46, 48 so provided as to fit over the sleeve portion 33A. The hydraulic actuator 6 of the output pulley 6 is supplied with working fluid pressure by the working fluid control unit 8, which adjusts the degree of communication between the drain passage 86 and the working fluid supply passageway 22 communicating with a source of hydraulic pressure.

Figure 6A:
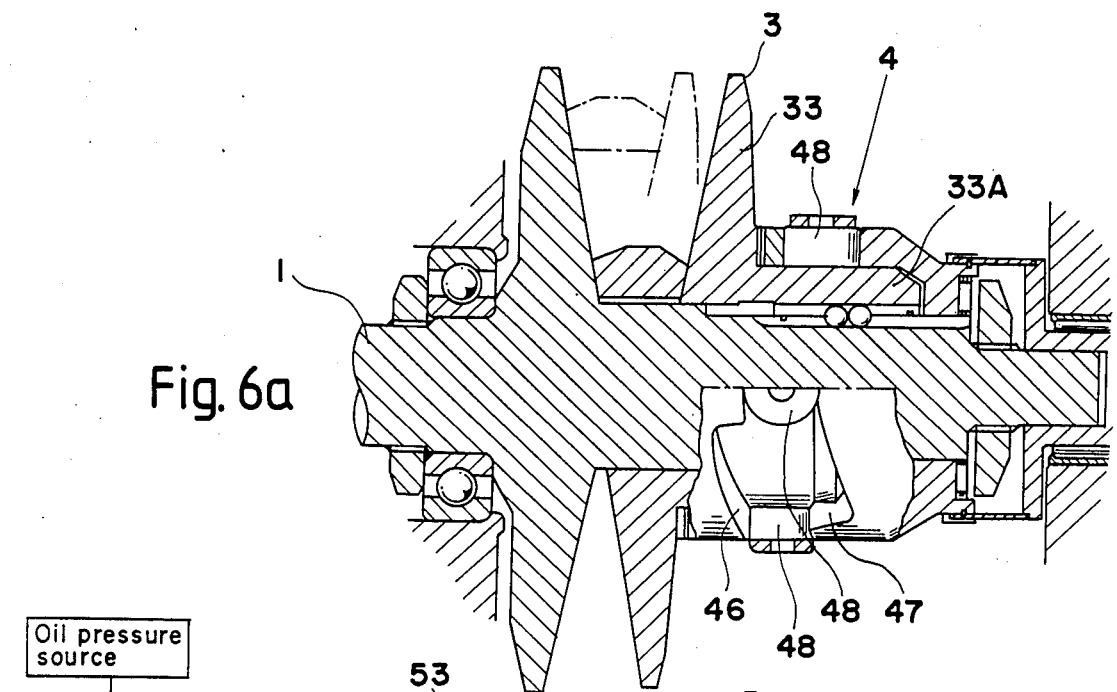
FIGS. 6A and 6B is a sectional view illustrating a fifth embodiment of a stepless belt transmission according to the present invention.
Figure 6B:
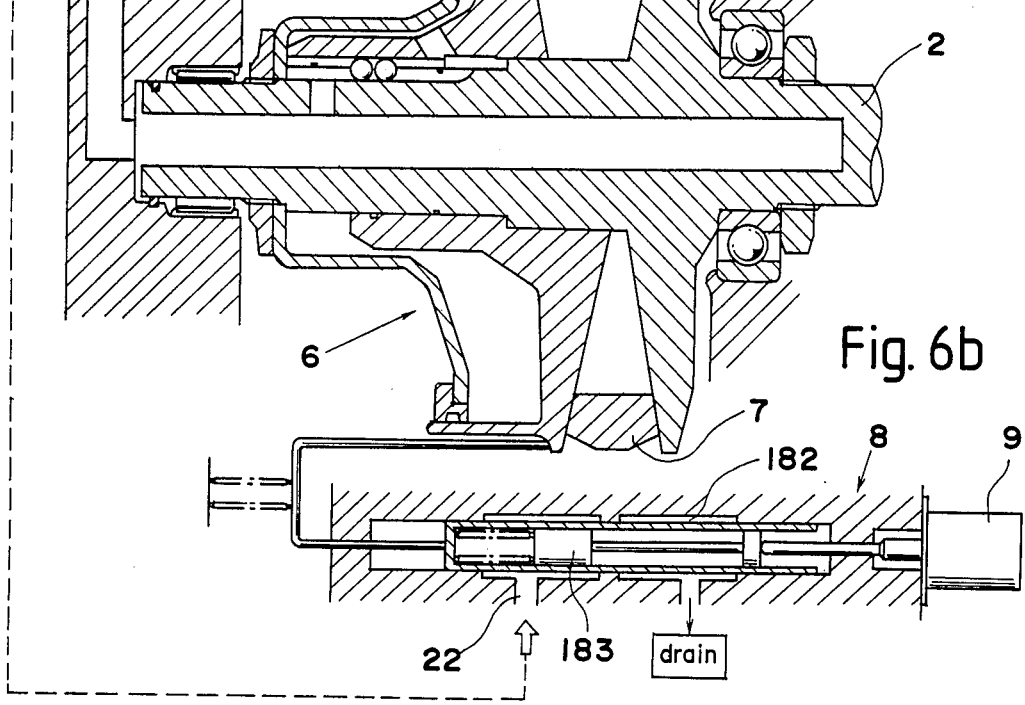

FIGS. 6A and 6B illustrate a fifth embodiment of the invention in which the control unit in the fourth embodiment of FIG. 5 is changed from the position of the output shaft to another location of the transmission case.

In FIG. 6B, a lead plunger 183 is driven by the drive mechanism 9 (which corresponds to driving the lead sleeve 82 in the fourth embodiment), and the movable flange 53 of output pulley 5 operates in association with a follow-up sleeve 182 (the follow-up plunger in the fourth embodiment).

Figure 7A:
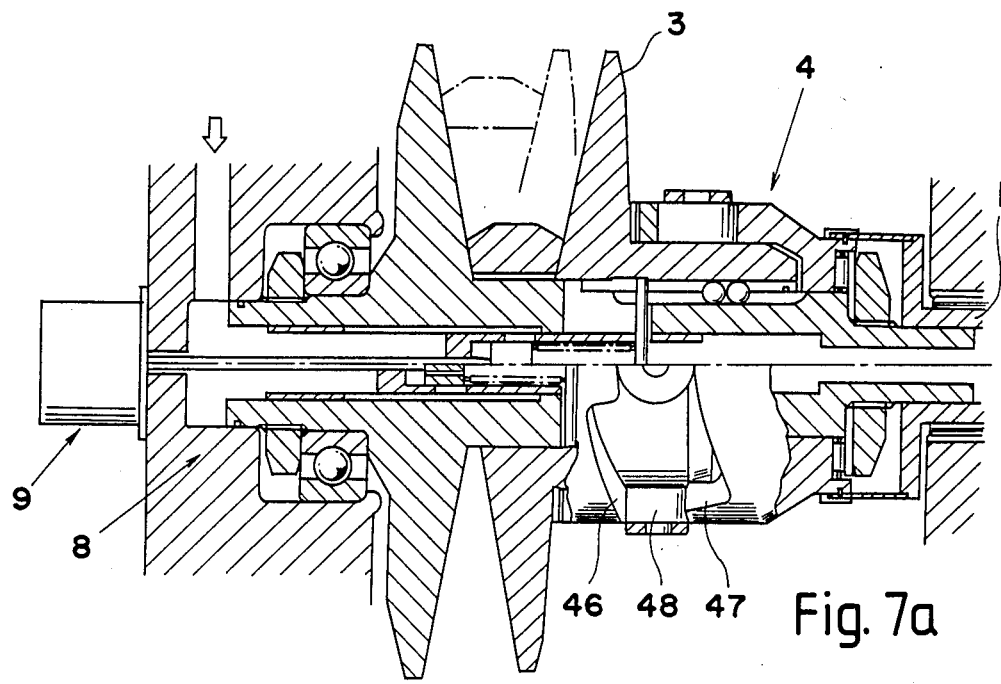
FIGS. 7A and 7B is a sectional view illustrating a sixth embodiment of a stepless belt transmission according to the present invention.
Figure 7B:
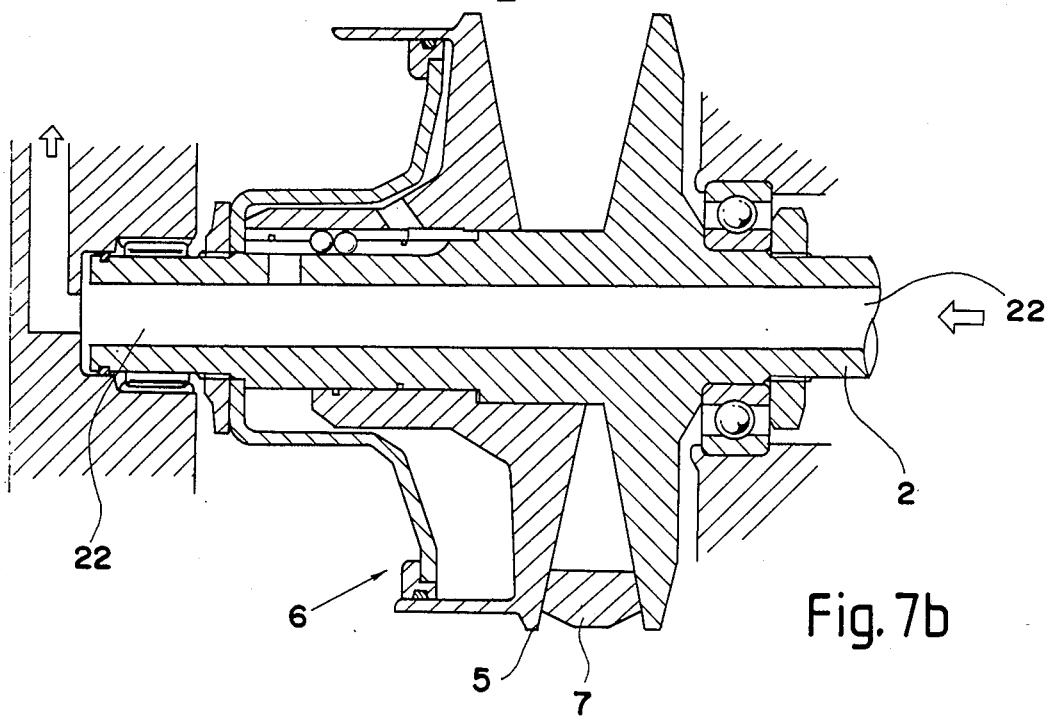

FIGS. 7A and 7B illustrate a sixth embodiment in which the control unit in the fourth embodiment is provided on the side of the input shaft 1.

In the embodiments set forth above, the working fluid control unit is described for two particular cases. In one, both supply and discharge ports for the supply and discharge of working fluid to and from a hydraulic actuator have their opening degree adjusted in dependence upon the vehicle running conditions. In the other, hydraulic pressure conforming to the vehicle running conditions is supplied to the hydraulic actuator in advance and only the opening degree of the discharge port (i.e., the degree of communication with the drain passage) is controlled. However, it is also possible to adopt an arrangement in which a discharge port having a constant contraction discharges the working fluid at all times and the opening degree of the supply port is varied in dependence upon the vehicle running conditions.

As many apparently widely different embodiments of the present invention can be made without departing from the spirit and scope thereof, it is to be understood that the invention is not limited to the specific embodiments thereof except as defined in the appended claims.

What is claimed is:

1. A belt-type stepless transmission for an automotive vehicle, comprising:

a transmission mechanism which comprises an input pulley and an output pulley of variable effective diameters, each having a movable flange and a stationary flange, a transmission belt stretched between the input and output pulleys, and servomechanisms for varying the effective diameters of the input and output pulleys, and wherein at least one of the servomechanisms being a hydraulic actuator; and a control unit operable for supplying the hydraulic actuator with a working fluid or for discharging the working fluid from the hydraulic actuator dependent upon running conditions of the automotive vehicle in order to shift the transmission mechanism, wherein the control unit comprises:

a supply port for supplying the working fluid to the hydraulic actuator;

a discharge port for discharging the working fluid from the hydraulic actuator;

a lead mechanism for changing working fluid pressure internally of the hydraulic actuator by varying an opening degree of the supply port or the discharge port by means of an electric motor controlled independently of the working fluid and dependent upon the running conditions of the automotive vehicle; and a follow-up mechanism operatively associated with a movable flange displaced by the changed working fluid pressure for restoring the opening degree varied by the lead mechanism, wherein the supply and discharge of the working fluid for operating the hydraulic actuator is controlled.

2. The belt-type stepless transmission as in claim 1, wherein the lead mechanism comprises a sleeve driven by the electric motor, and the follow-up mechanism comprises a plunger having one end being disposed in the sleeve with a spring and having another end which is mechanically brought into contact with the movable flange.

3. The belt-type stepless transmission as in claim 1, wherein the lead mechanism comprises a plunger driven by the electric motor, and the follow-up mechanism has a sleeve having one end which is brought into contact with the movable flange, and wherein the plunger is resiliently disposed in the sleeve.

* * * * *